(12) United States Patent
Morgana et al.

(10) Patent No.: US 10,255,482 B2
(45) Date of Patent: Apr. 9, 2019

(54) INTERACTIVE DISPLAY FOR FACIAL SKIN MONITORING

(71) Applicant: Xerox Corporation, Norwalk, CT (US)

(72) Inventors: Stephen C. Morgana, Rochester, NY (US); Raja Bala, Pittsford, NY (US); Matthew Adam Shreve, Webster, NY (US); Luisa Fernanda Polania Cabrera, Webster, NY (US); Paul Jonathan Matts, Surrey (GB); Ankur Purwar, Sunglade (SG)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

(21) Appl. No.: 15/414,189

(22) Filed: Jan. 24, 2017

(65) Prior Publication Data
US 2017/0270348 A1    Sep. 21, 2017

Related U.S. Application Data

(60) Provisional application No. 62/311,200, filed on Mar. 21, 2016.

(51) Int. Cl.
*G06K 9/00* (2006.01)
*H04N 5/232* (2006.01)
*H04N 1/00* (2006.01)

(52) U.S. Cl.
CPC ..... *G06K 9/00255* (2013.01); *G06K 9/00275* (2013.01); *H04N 1/00222* (2013.01); *H04N 1/00244* (2013.01); *H04N 5/23219* (2013.01); *H04N 5/23222* (2013.01); *H04N 5/23293* (2013.01); *H04N 2201/0084* (2013.01)

(58) Field of Classification Search
None
See application file for complete search history.

(56) References Cited

U.S. PATENT DOCUMENTS

| | | | |
|---|---|---|---|
| 5,983,120 A | 11/1999 | Groner et al. | |
| 8,077,931 B1 * | 12/2011 | Chatman | G06T 7/0012 382/118 |
| 2007/0071314 A1 | 3/2007 | Bhatti | |
| 2007/0104472 A1 | 5/2007 | Quan | |
| 2008/0080746 A1 | 4/2008 | Payonk | |

(Continued)

OTHER PUBLICATIONS

All Office Actions, U.S. Appl. No. 15/414,002.
(Continued)

*Primary Examiner* — Janese Duley
(74) *Attorney, Agent, or Firm* — John G. Powell (57) ABSTRACT

A method, non-transitory computer readable medium and apparatus for generating an interactive image of facial skin of a user that is displayed via a mobile endpoint device of the user are disclosed. For example, the method includes displaying a guide to position a face of the user, capturing an image of the face of the user, transmitting the image to a facial skin analysis server for analyzing one or more parameters of the facial skin of the user, receiving the interactive image of the face of the user that includes metadata associated with the one or more parameters of the facial skin that were analyzed by the facial skin analysis server, and displaying the interactive image of the face of the user.

18 Claims, 8 Drawing Sheets

(56) References Cited

U.S. PATENT DOCUMENTS

| | | | |
|---|---|---|---|
| 2008/0194928 A1* | 8/2008 | Bandic | G16H 15/00 600/306 |
| 2009/0245603 A1 | 10/2009 | Koruga | |
| 2010/0172567 A1 | 7/2010 | Prokoski | |
| 2011/0016001 A1* | 1/2011 | Schieffelin | A61B 5/0059 705/14.66 |
| 2011/0196616 A1 | 8/2011 | Gunn | |
| 2012/0223131 A1 | 9/2012 | Lim | |
| 2013/0041733 A1 | 2/2013 | Officer | |
| 2013/0079620 A1 | 3/2013 | Kuth et al. | |
| 2013/0094780 A1 | 4/2013 | Tang et al. | |
| 2013/0158968 A1 | 6/2013 | Ash et al. | |
| 2014/0089017 A1 | 3/2014 | Klappert et al. | |
| 2014/0201126 A1* | 7/2014 | Zadeh | G06K 9/627 706/52 |
| 2014/0209682 A1 | 7/2014 | Gottwals et al. | |
| 2014/0211022 A1 | 7/2014 | Koh et al. | |
| 2014/0219526 A1* | 8/2014 | Linguraru | G06K 9/00281 382/128 |
| 2014/0270490 A1 | 9/2014 | Wus et al. | |
| 2014/0334723 A1 | 11/2014 | Chatow | |
| 2015/0045631 A1 | 2/2015 | Pederson | |
| 2016/0162728 A1 | 6/2016 | Arai et al. | |
| 2017/0246473 A1 | 8/2017 | Marinkovich | |
| 2017/0270349 A1 | 9/2017 | Polania Cabrera et al. | |
| 2017/0270350 A1 | 9/2017 | Maltz et al. | |
| 2017/0270691 A1 | 9/2017 | Maltz et al. | |
| 2017/0272741 A1 | 9/2017 | Maltz et al. | |

OTHER PUBLICATIONS

All Office Actions, U.S. Appl. No. 15/414,095.
All Office Actions, U.S. Appl. No. 15/414,147.
All Office Actions, U.S. Appl. No. 15/414,305.
Finlayson et al., Color by Correlation: A Simple, Unifying Framework for Color Constancy, IEEE Transactions on Pattern Analysis and Machine Intelligence, vol. 23, No. 11, Nov. 2001, pp. 1209-1221.
Gong et al., Quantification of Pigmentation in Human Skin Images, IEEE, 2012, pp. 2853-2856.
Hyvarinen et al., A Fast Fixed-Point Algorithm for Independent Component Analysis of Complex Valued Signals, Neural Networks Research Centre, Helsinki University of Technology, Jan. 2000, 15 pages.
Hyvarinen et al., A Fast Fixed-Point Algorithm for Independent Component Analysis, Neural Computation, 9:1483-1492, 1997.
Ojima et al., Application of Image-Based Skin Chromophore Analysis to Cosmetics, Journal of Imaging Science and Technology, vol. 48, No. 3, May 2004, pp. 222-226.
Sun et al., Statistical Characterization of Face Spectral Reflectances and Its Application to Human Portraiture Spectral Estimation, Journal of Imaging Science and Technology, vol. 46, No. 6, 2002, pp. 498-506.
Tsumura et al., Image-based skin color and texture analysis/synthesis by extracting hemoglobin and melanin information in the skin, ACM Transactions on Graphics (TOG), vol. 22, Issue 3, Jul. 2003, pp. 770-779.

* cited by examiner

INTERACTIVE DISPLAY FOR FACIAL SKIN MONITORING

CROSS REFERENCE TO RELATED APPLICATIONS

This application claims priority under 35 U.S.C. § 119(e) to U.S. provisional patent application Ser. No. 62/311,200, filed on Mar. 21, 2016, which is hereby incorporated by reference in its entirety.

The present disclosure relates generally to facial image analysis and, more particularly, to an interactive display for facial skin monitoring of a user including capturing, marking and visualizing facial skin conditions of the user.

BACKGROUND

Some companies are beginning to develop products or applications to improve a consumer's skincare experience. The applications look to provide product recommendations and navigation solutions. The applications can also provide personalized skincare for the customer by providing continuous support, educating the user about skin biology, tracking the customer's skin performance over time, and customizing product and regiment solutions to the customer's individual needs.

One challenge to providing such applications is an ability to receive an accurate image of the customer's face and providing an accurate analysis of the customer's face based on the image. Some solutions may require the customer to come to a lab or a studio of the company to take images with high quality cameras in a controlled light setting. However, requiring the customer to travel to another lab or studio is time consuming and inconvenient to the customer.

Another option may be to analyze images provided by the customer. However, images provided by the customer can have a large amount of variation in image quality and lighting.

SUMMARY

According to aspects illustrated herein, there are provided a method, non-transitory computer readable medium and apparatus for generating an interactive image of facial skin of a user that is displayed via a mobile endpoint device of the user. One disclosed feature of the embodiments is a method that displays a guide to position a face of the user, captures an image of the face of the user, transmits the image to a facial skin analysis server for analyzing one or more parameters of the facial skin of the user, receives the interactive image of the face of the user that includes metadata associated with the one or more parameters of the facial skin that were analyzed by the facial skin analysis server, and displays the interactive image of the face of the user.

Another disclosed feature of the embodiments is a non-transitory computer-readable medium having stored thereon a plurality of instructions, the plurality of instructions including instructions which, when executed by a processor, cause the processor to perform operations that display a guide to position a face of the user, capture an image of the face of the user, transmit the image to a facial skin analysis server for analyzing one or more parameters of the facial skin of the user, receive the interactive image of the face of the user that includes metadata associated with the one or more parameters of the facial skin that were analyzed by the facial skin analysis server, and display the interactive image of the face of the user.

Another disclosed feature of the embodiments is an apparatus comprising a processor and a computer-readable medium storing a plurality of instructions which, when executed by the processor, cause the processor to perform operations that display a guide to position a face of the user, capture an image of the face of the user, transmit the image to a facial skin analysis server for analyzing one or more parameters of the facial skin of the user, receive the interactive image of the face of the user that includes metadata associated with the one or more parameters of the facial skin that were analyzed by the facial skin analysis server, and display the interactive image of the face of the user.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses a method and apparatus for generating an interactive image of facial skin of a user that is displayed via a mobile endpoint device of the user. As discussed above, some companies are beginning to develop products or applications to improve a consumer's skincare experience. In doing so, an image of the customer can be used to analyze the health of the customer's skin. The image of the customer's skin can be analyzed and feedback of the analysis can be provided visually back to the user via the interactive image.

Embodiments of the present disclosure provide a method and apparatus to generate and display an interactive image via the mobile endpoint device of the user. The interactive image may include details of one or more parameters associated with a health of the facial skin of the user that is analyzed based on an image taken by the user.

In addition, to ensure that a proper image is taken that can be analyzed accurately, the application may guide the user to take the proper selfie image. For example, the user may be guided (e.g., via an outline shown on the display of the mobile endpoint device) to turn his or head at a proper angle, capture a proper size, have a proper lighting level, and the like.

The captured image may be sent to a remotely located facial skin analysis server that analyzes the image and can generate the interactive image. The interactive image may include metadata that annotates various facial regions of the interactive image for display when selected by the user. The interactive image can then be transmitted back to the mobile endpoint device of the user for display.

Figure 1:
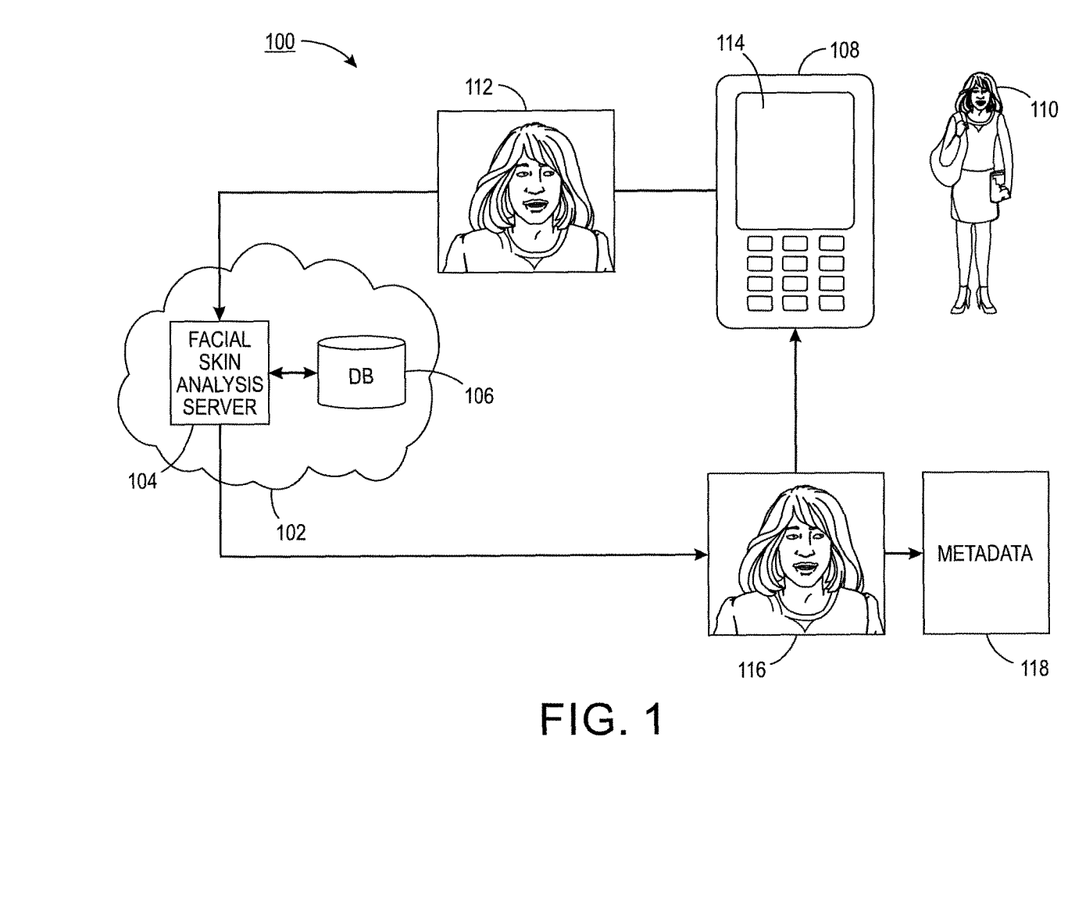
FIG. 1 illustrates an example block diagram of a communication network of the present disclosure.

FIG. 1 illustrates an example system 100 of the present disclosure. In one embodiment, the system 100 may include a communication network 102. The communication network 102 may be any type of wired or wireless communication network. In one embodiment, the communication network 100 may be an Internet Protocol (IP) network.

It should be noted that the communication network 102 has been simplified for ease of explanation. For example, the communication network 102 may include one or more additional network elements (e.g., a router, a gateway, a border element, switches, and the like) or access networks (e.g., a cellular access network, a broadband access network, and the like) that are not shown.

In one embodiment, the communication network 102 may include a facial skin analysis server (FSAS) 104 and a database (DB) 106. In one embodiment, the FSAS 104 may establish a wired or wireless connection with one or more mobile endpoint devices 108 to receive and transmit images to the one or more mobile endpoint devices 108 and perform the functions described herein.

In one embodiment, the DB 106 may store various information associated with the functions described herein. For example, the DB 106 may store graphs generated based on training images, one or more images 112 received from the one or more endpoint devices 108 of one or more customers 110 (also referred to herein generically as "a user" or "users"), generated graphical chromophore maps, one or more interactive images 116 generated by the FSAS 104, metadata 118, and the like.

It should be noted that although FIG. 1 illustrates a single mobile endpoint device 108, a single customer 110, a single FSAS 104, and a single DB 106, that any number of mobile endpoint devices, customers, FSASs and DBs may be deployed. For example, multiple FSASs 104 may be deployed to perform a distributed processing of the images 112. In another example, a plurality of mobile endpoint devices 108 may be sending images of different customers 110 to be analyzed and processed to generate respective interactive images 116 for each customer 110.

Figure 2:
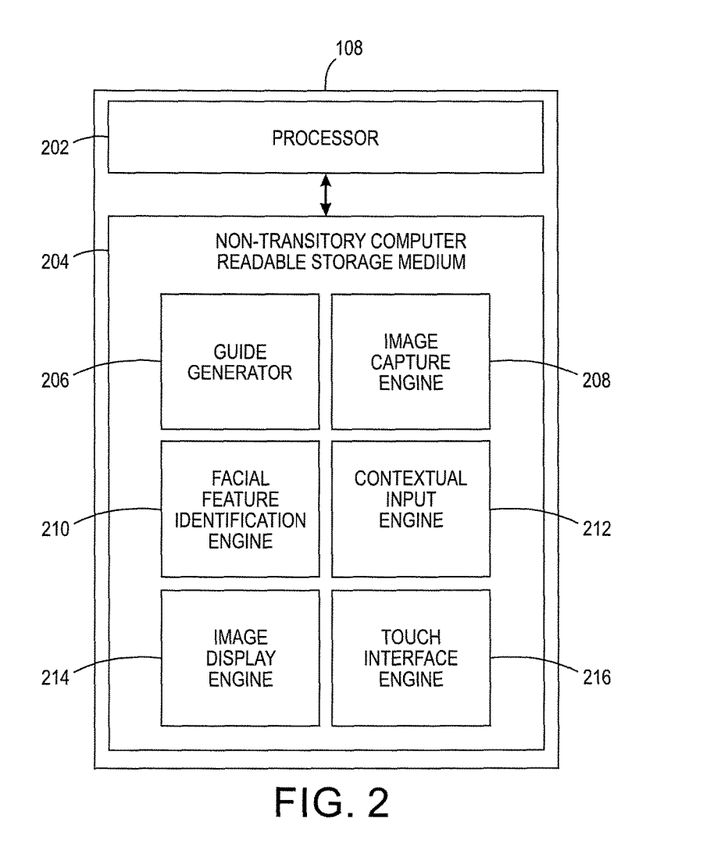
FIG. 2 illustrates an example apparatus of the present disclosure.

In one embodiment, the mobile endpoint device 108 may include a mobile skin care application. The mobile skin care application may be used to help provide a customized skincare experience for the customer 110. FIG. 2 illustrates one example of the mobile endpoint device 108.

In one embodiment, the mobile endpoint device 108 may include a processor 202 and a non-transitory computer readable storage medium 204. In one embodiment, the non-transitory computer readable storage medium 204 may include engines or modules that include instructions that are executed by the processor 202 to perform the functions described herein. For example, the non-transitory computer readable storage medium 204 may include the mobile skin care application that is executed by the processor 202.

In one embodiment, the non-transitory computer readable storage medium 204 may include a guide generator 206, an image capture engine 208, a facial feature identification engine 210, a contextual input engine 212, an image display engine 214 and a touch interface engine 216. In one embodiment, the guide generator 206 may generate and display a guide 404 illustrated in FIG. 4.

Figure 4:
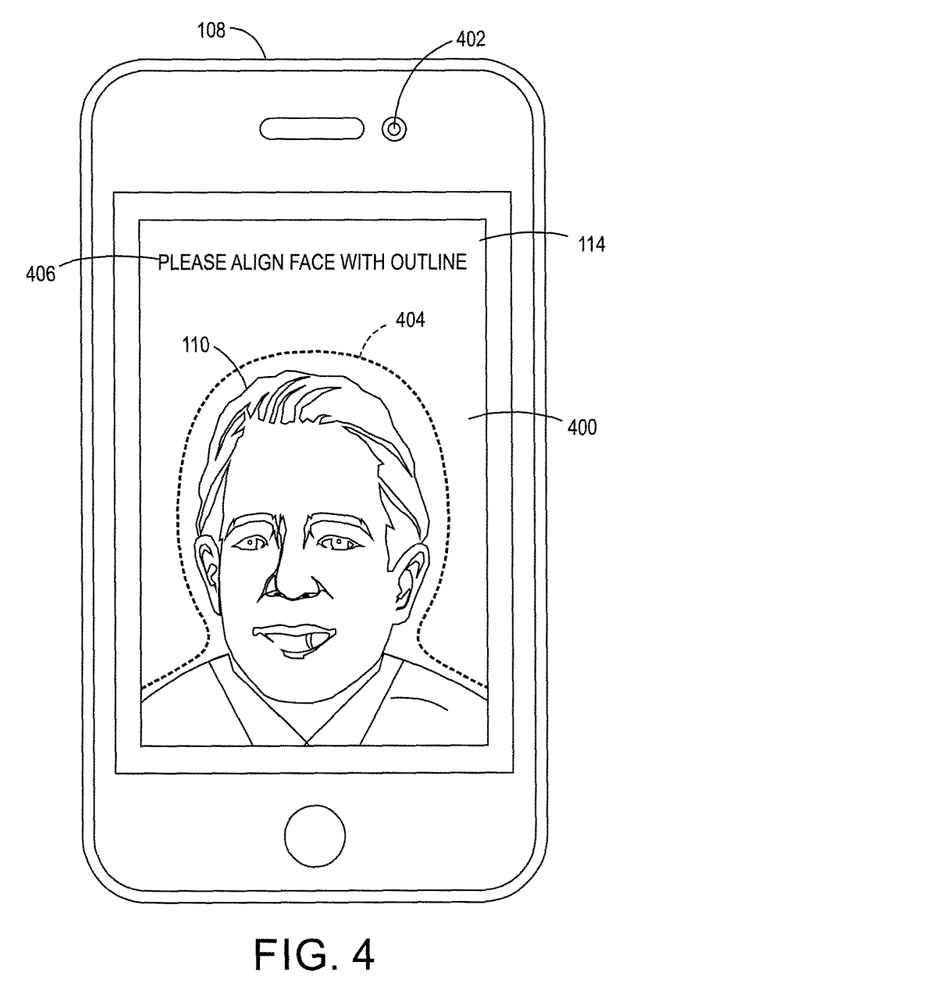
FIG. 4 illustrates an example graphical user interface of the present disclosure.

For example, the mobile skin care application may leverage a camera 402 and/or a flash (not shown) of the mobile endpoint device 108 to capture the image 112 of the customer 110. The image 112 may also be referred to as a mobile selfie image. In other words, the image 112 captures a face or headshot of the customer 110.

In one embodiment, a display 114 of the mobile endpoint device may help position the face of the customer 110 properly to capture a proper image 112 using the guide 404. For example, the display 114 may display the guide 404 to allow the customer 110 to properly position his or her head, or face, at a proper angle, at a proper size, with a proper amount of lighting, and the like.

FIG. 4 illustrates one example of a graphical user interface (GUI) 400 that illustrates the guide 404. In one embodiment, the camera 402 of the mobile endpoint device 108 may be pointed at the face of the customer 110. The display 114 may display an image of the customer 110. Overlaid on top of the image of the customer 110 may be the guide 404 illustrated by dashed lines.

In one embodiment, the guide 404 may ensure that the face of the customer 110 is at a proper position with respect to an angle or amount of turn and a size. In one embodiment, the display 114 may also include a message 406 to help guide the customer 110. For example, if the customer 110 is not aligned with the guide 404, the message 406 may notify the customer 110 to align his or her face with the outline of the guide 404. In another embodiment, the message 406 may notify the customer 110 if there is not enough light. For example, the message 406 may indicate to turn on the flash of the mobile endpoint device, retake the picture in a brighter room, and the like.

Figure 5:
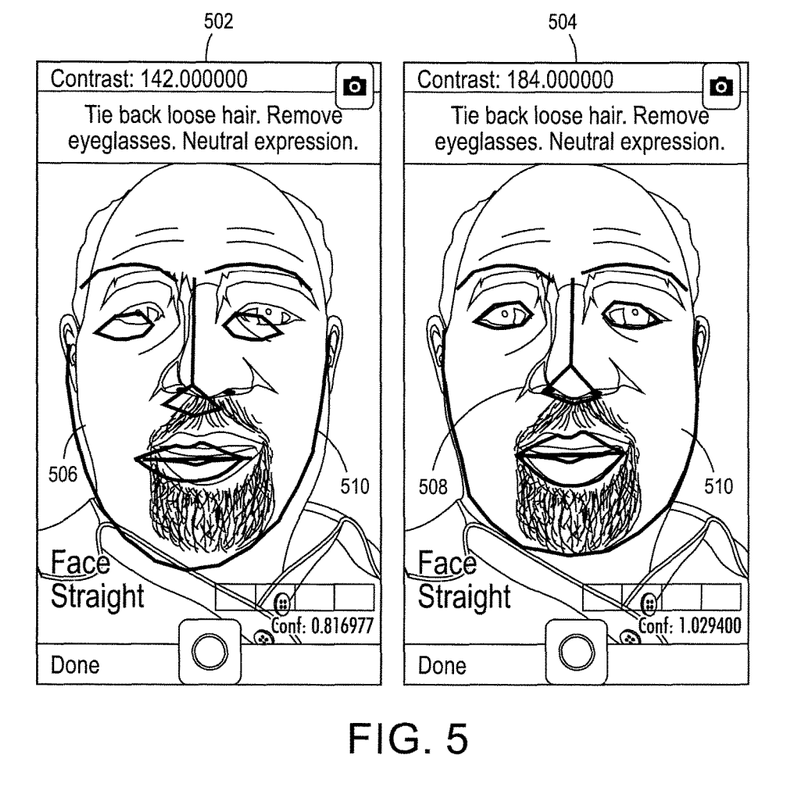
FIG. 5 illustrates an example of a personalized guide.

In one embodiment, the guide 404 may be adapted to be a personalized guide. FIG. 5 illustrates a display 502 that uses a generic guide 506 that is overlaid on a face 510 of the customer 110. As shown by the display 502, when the customer 110 first launches the mobile skin care application, the generic guide 506 may be used. As shown in the display 502, the facial features of the generic guide 506 may be misaligned with facial features (e.g., the eyes, nose, mouth, the size of the customer's head, and the like) of the face 510 of the customer 110.

In one embodiment, the generic guide 506 may be computed based on a combination of multiple individual facial masks. For example, a facial mask for a customer 110 may be extracted by performing a face detection on selfie images using a standard face detector. Then, facial landmarks may be detected using a facial landmark algorithm. The sets of landmark points from multiple faces may be aligned and the spatial (x-y) coordinates for corresponding points may be combined using the mean location of each landmark. It should be noted that other statistical methods for combining the set of points can be used including, for example, median, weighted average, statistical norms, among others, and may also include outlier detection. Finally, the combined landmark points may be connected with straight lines to create the generic guide 506. In other embodiments, a more sophisticated generic mask 506 including 3-D wireframe meshes may also be created.

After a first time the image 112 is captured, the generic guide 506 may be customized to a personalized guide 508 that aligns to the facial features of the face 510 of the customer as shown in a display 504. For example, the eyes, the nose, the mouth, the size and shape of the general outline of the face 510 of the customer 110 may be aligned with the personalized guide 508.

In one embodiment, to create the personalized guide 508, the process described above to create the generic mask 506 may be repeated using the image 112 of the customer 110.

Once the personalized guide 508 is created, the personalized guide 508 may be stored in the mobile skin care application on the mobile endpoint device 108 and re-used for capturing subsequent images 112 of the customer 110.

In one embodiment, the personalized guide 508 may also appear as a ghosted image of the face of the customer 110. In other words, the ghosted image may be a previously captured image of the customer 110 that is adjusted to be slightly transparent such that the face of the customer can be seen through the ghosted image on the display of the mobile endpoint device 108. As a result, the customer 110 may align his or her face with the ghosted image.

Referring back to FIG. 2, in one embodiment, the image capture engine 208 may then automatically take a plurality of images 112 once the face of the customer 110 is properly positioned. For example, the plurality of images 112 may be taken at different settings. For example, the plurality of images 112 may be taken at different f/stops to vary the exposure of each one of the plurality of images 112 to ensure that the FSAS 104 has a proper image 112 for analyzing.

In one embodiment, the facial feature identification engine 210 may identify a plurality of facial regions of the face of the customer 110 from the image 112. In one embodiment, the plurality of facial regions may be identified using a D-lib based face detector. The D-lib based face detector is an algorithm that provides facial landmark points. For example, a total of 68 landmark points may be detected on the face (e.g., the boundary of the eyes, face, lips, and the like) using D-lib. Since the landmark locations may be fixed (e.g., point 1 is always the upper cheek and point 28 is always the top left of the left eye) polygonal regions may be drawn on the face by drawing lines between certain points of the 68 landmark points. For example, the facial regions of the forehead, the left eye and right eye, under the left and right eye, the left cheek, the right cheek and the chin may be drawn. In another example, these points may be inferred based on models of the face to generate curved boundaries of each facial regions. In addition, the models of the face may be trained manually based on statistical ratios of the face, or using an automatic or semi-automatic approach that learns these regions from labeled data.

A mask may be created for each of the shapes defined by the facial regions that are drawn. The masks may consist of the same number of pixels as the original areas in the image 112. In addition, each pixel of the mask may be a binary value that indicates whether the pixel is inside of a respective mask or not (e.g., a value of 1 if the pixel is within a respective mask or a value of 0 if the pixel is outside of the respective mask). A polygon may also be generated for each facial shape region for later operations based on the polygons, such as, detecting user touches within a region on his or her displayed face.

Then, logical operations can be performed on the image 112, thus, restricting analysis to a region of interest. For instance, if a local "AND" operation is done between the mask and image 112, all pixel values at locations outside of the mask may be set to 0, while the pixel values at locations inside of the defined mask region may be unchanged.

A mask can comprise multiple regions by performing logical "OR" operations. For example, if the left cheek mask is OR'ed with the right cheek mask, a new mask may be generated that consists of both cheeks.

In one embodiment, the contextual input engine 212 may receive contextual input from the customer 110. For example, the customer 110 may enter contextual input (e.g., text, a description, a note, a question, and the like) for a particular facial region. For example, the customer 110 may note that a scar is located from a childhood accident in the forehead region, or that the customer 110 suffers from a medical skin condition, such as rosacea, in both cheek regions, note a spot on the chin region of the customer 110 for the system to determine if the spot is abnormal, and the like. The contextual input may be associated with specific facial regions and added to the image 112 for transmission to the FSAS 104.

In one embodiment, the image display engine 214 may display the image 112 that is captured for review and approval and/or display the interactive image 116 and the metadata 118. For example, the image display engine 214 may format the image 112 or the interactive image 116 for proper display via the display 114 of the mobile endpoint device 108. For example, the image display engine 214 may ensure that the image 112 or the interactive image 116 is displayed with a correct color, at a correct resolution, at a correct aspect ratio, and the like.

In one embodiment, the touch interface engine 216 may detect when the customer 110 has selected a portion of the interactive image 116 that is displayed and interpret the selection with respect to the interactive image 116. For example, as discussed in further detailed below, after the image 112 is analyzed one or more parameters may be associated with each facial region of the image 112. The interactive image 116 may be generated based on the image 112 and the one or more parameters associated with each facial region.

The interactive image 116 may be displayed to the customer 110 and the customer 110 may select a facial region of the interactive image 116. For example, a right eye region may be selected causing the interactive image 116 to display a more detailed visualization of the right eye region.

Figure 6:
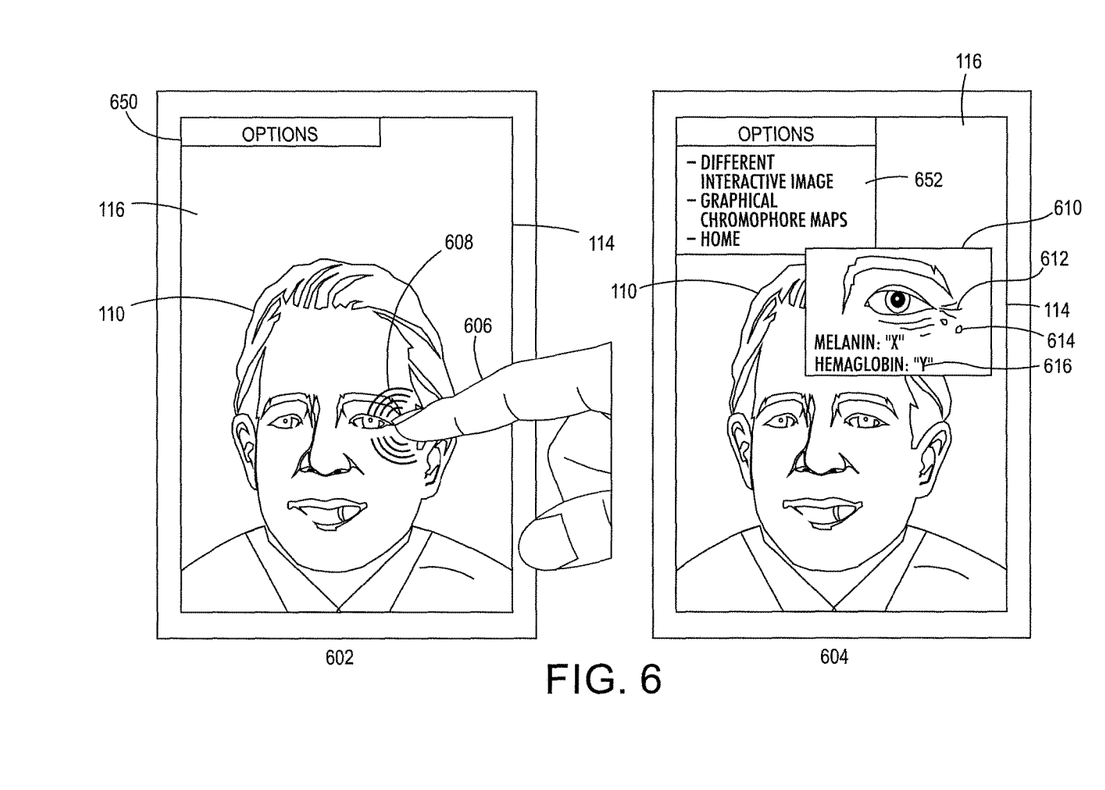
FIG. 6 illustrates an example interactive image of the present disclosure.

FIG. 6 illustrates an example of the interactive image 116. In one embodiment, the interactive image 116 can be displayed as shown in a screenshot 602. The customer 110 may want to know more details about the left eye facial region using his or her finger 606 (or any other input device) to select the region via an input 608 provided on the interactive image 116.

As a result, the region selected by the customer 110 may be a magnified, a blown out, or an enlarged pop-up image to display a detailed visualization 610 of the left eye region. In another embodiment, the detailed visualization 610 may be highlighting the selected facial region in color. For example, the interactive image 116 may be displayed as a black and white image. However, when a facial region is selected, the selected facial region may be changed into a color image to provide the detailed visualization 610.

In one embodiment, the detailed visualization 610 may include highlighted lines 612 that illustrate detected wrinkles or circular outlines 614 that illustrate detected moles, pimples or other skin variations. In one embodiment, the detailed visualization 610 may also provide values for various parameters such as melanin content and hemoglobin content that can be correlated to other skin diseases or provide a measure of skin health.

In one embodiment, the detailed visualization 610 may also display answers to any questions about a particular facial region that was input by the customer 110 as contextual input, as described above. For example, some of the metadata 118 may include the answers to questions received in the contextual input or additional comments added to the contextual input.

Referring back to the screenshot 602, the interactive image 116 may also include an options menu 650. The options menu 650 may be selected to expand and display additional options 652 as shown in the screenshot 604. For example, the additional options 652 may include an option to select a different interactive image, display a graphical chromophore map that was generated, go back to a home menu, and the like.

Figure 3:
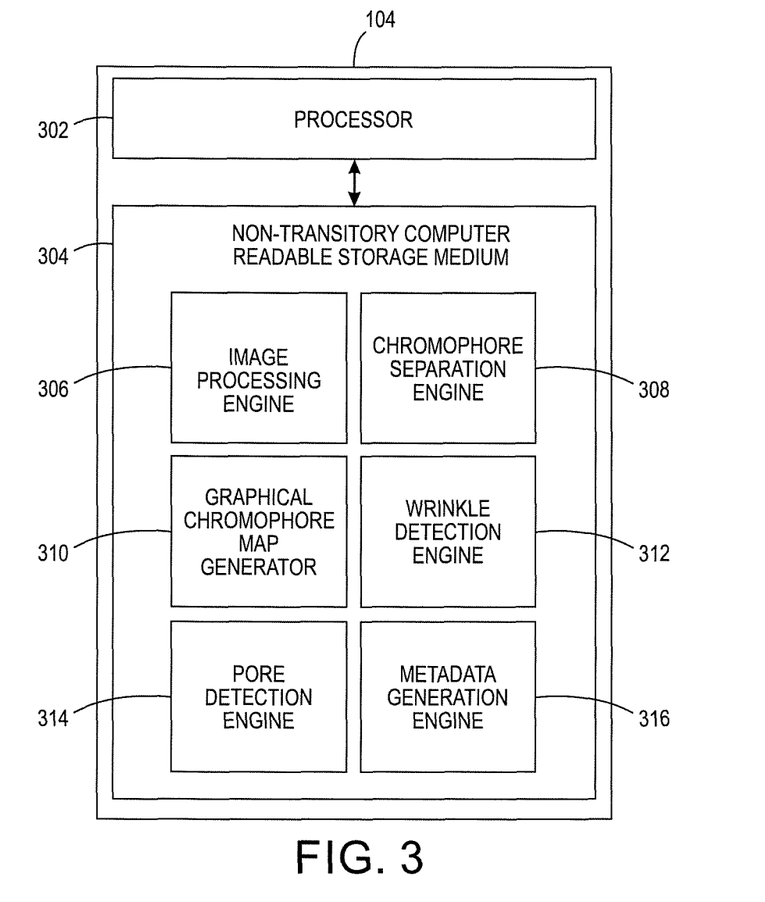
FIG. 3 illustrates an example facial skin analysis server of the present disclosure.

Referring back to FIG. 1, the mobile endpoint device 108 may send the image 112 to the FSAS 104 for processing to generate the interactive image 116 and the metadata 118. FIG. 3 illustrates an example of the FSAS 104.

In one embodiment, the FSAS 104 may include a processor 302 and a non-transitory computer readable storage medium 304. In one embodiment, the non-transitory computer readable storage medium 304 may include engines or modules that include instructions that are executed by the processor 302 to perform the functions described herein. For example, the non-transitory computer readable storage medium 304 may include the mobile skin care application that is executed by the processor 302.

In one embodiment, the non-transitory computer readable storage medium 304 may include an image processing engine 306, a chromophore separation engine 308, a graphical chromophore map generator 310, a wrinkle detection engine 312, a pore detection engine 314, and a metadata generation engine 316. In one embodiment, the image processing engine 306 may be used to receive the image 112 that is taken in the red, green, blue (RGB) color space and convert the image 112 into a spectral representation. The spectral representation may then be used to perform chromophore separation that is used to determine an amount of melanin and hemoglobin in areas of the facial skin and to generate the graphical chromophore maps, as described by co-pending U.S. Patent Provisional Application Ser. No. 62/311,175, entitled "METHOD AND APPARATUS FOR GENERATING GRAPHICAL CHROMOPHORE MAPS," filed on Mar. 21, 2016, which is incorporated by reference in its entirety.

In one embodiment, the image processing engine 306 may also generate the interactive image 116. For example, the interactive image 116 may be generated with the one or more parameters that are analyzed from the image 112 by the various engines 308, 312, 314 and 316, as described below. The image processing engine 306 may define the boundaries for each facial region that was identified for touch interaction, format the interactive image 116 to be compatible with a particular mobile endpoint device 108, and the like.

In one embodiment, the chromophore separation engine 308 may perform a constrained independent component analysis on the spectral representation of the image 112 to obtain three or more independent components. In one embodiment, the three or more independent components may be a melanin component, a hemoglobin component, and a shading component. In one embodiment, obtaining a separate shading component allows the shading component to be removed from the graphical chromophore maps of the melanin and hemoglobin, thereby providing more accurate graphical chromophore maps.

In one embodiment, the independent components may be obtained from the spectral representation of the image 112 using a constrained independent component analysis (ICA). One example of the constrained ICA is described in co-pending U.S. Patent Provisional Application Ser. No. 62/311,175, entitled "METHOD AND APPARATUS FOR GENERATING GRAPHICAL CHROMOPHORE MAPS," filed on Mar. 21, 2016, which is incorporated by reference in its entirety.

In one embodiment, the graphical chromophore map generator 310 may then generate a graphical chromophore map for one or more of the independent components that are separated. In one embodiment, the graphical chromophore map generator 310 may generate a hemoglobin graphical chromophore map and a melanin graphical chromophore map. The graphical chromophore maps may illustrate or display the texture of the facial skin of the customer 110. For example the texture may reveal moles, freckles, and other skin variations.

In one embodiment, the wrinkle detection engine 312 may detect wrinkles in the image 112 and provide highlighting or markings for the wrinkles that are detected in the detailed visualization 610 of the interactive image 116, as illustrated in FIG. 6 and described above. In one embodiment, a Hessian based Frangi Filtering operation may be applied to the facial regions that are identified from the image 112 to detect the wrinkles. A morphological filtering operation may be applied to remove spurious edges that are detected as potential wrinkles by the Hessian based Frangi Filtering operation. The remaining edges may be analyzed further using a connected component analysis, and an ellipse can be fitted around each connected component. A length of a major and minor axis of the ellipse, and as well as an area and an orientation (e.g., vertically aligned wrinkles and horizontally aligned wrinkles) may be stored.

In one embodiment, the pore detection engine 314 may detect pores in the image 112 and provide circular outlines 614 of the pores that are detected in the detailed visualization 610 of the interactive image 116 as illustrated in FIG. 6 and described above. In one embodiment, any operation for detecting pores may be used. In one embodiment, the pores may be detected based on a circular Hough transform.

In one embodiment, the metadata generation engine 316 may annotate the interactive image 116 with metadata 118. The metadata 118 may include a date and time that the image 112 was taken, a date and time the interactive image 116 was generated, answers to questions that were received via the contextual input from the customer 110, details of the one or more parameters that are analyzed for each one of the different facial regions that will be displayed in a respective detailed visualization of a selected facial region, and the like.

Referring back to FIG. 1, the FSAS 104 may generate the interactive image 116 based on analysis and processing of the image 112 taken by the mobile endpoint device 108 of the customer 110. The FSAS 104 may then transmit the interactive image 116 and the metadata 118 that is generated back to the mobile endpoint device 108. The interactive image 116 may then be displayed to the customer 110 via the display 114 of the mobile endpoint device as illustrated by example in FIG. 6.

Thus, the present disclosure provides an interactive display for facial skin monitoring that allows the customer 110 to monitor the health of his or her facial skin. Selfie images may be occasionally taken of the customer 110 and transmitted to the FSAS 104 for analysis. The mobile endpoint device 108 can track the health status of the facial skin of the customer 110 over time via graphs, charts, reports, and the like. As a result, the customer 110 may determine an overall trend of his or her facial skin and also be provided with recommendations for action, skin care products, and the like, based on the facial skin health status trend of the customer 110.

Figure 7:
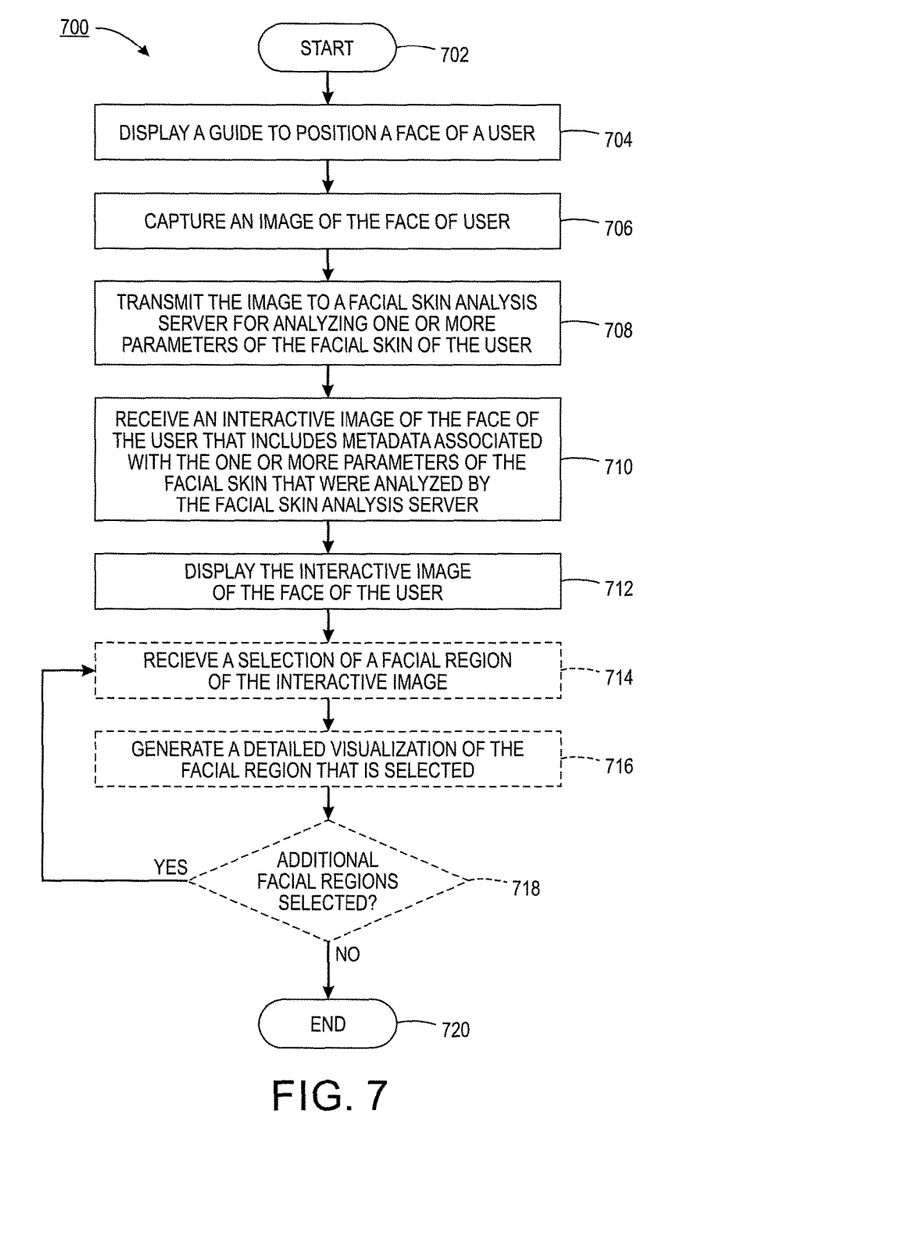
FIG. 7 illustrates a flowchart of an example method for generating an interactive image of facial skin of a user that is displayed via a mobile endpoint device of the user.
Figure 8:
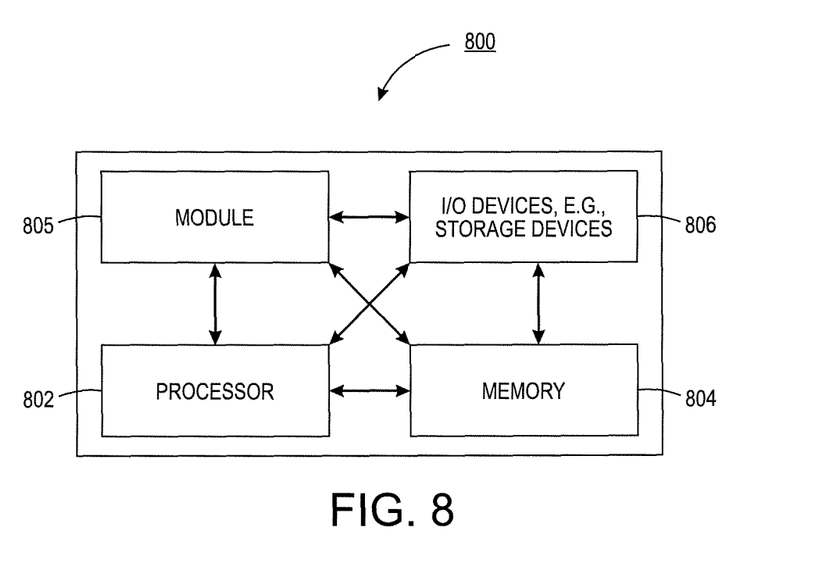
FIG. 8 illustrates a high-level block diagram of a computer suitable for use in performing the functions described herein.

FIG. 7 illustrates a flowchart of an example method 700 for generating an interactive image of facial skin of a user that is displayed via a mobile endpoint device of the user. In one embodiment, one or more steps or operations of the method 700 may be performed by the mobile endpoint device 108 or a computer as illustrated in FIG. 8 and discussed below.

At block 702, the method 700 begins. At block 704, the method 700 displays a guide to position a face of a user. For example, an outline in the shape of a head or a face may be overlaid on top of a preview image of the user before capturing the image. In one embodiment, the initial guide may initially be an outline of a face of a generic model. After a first selfie image is capture and analyzed, the shape of the user's face or head may be learned. For subsequently captured images, the outline may be changed to a shape that corresponds to a shape of the face of the user.

In other words, as the user continues to capture selfie images, the guide may be customized to the shape of the face of each different user. Said another way, each user may have a differently shaped guide or outline.

At block 706, the method 700 captures an image of the face of the user. In one embodiment, the image may be captured as an RGB image. In one embodiment, the method 700 may capture a plurality of different images of the face of the user. Each different image may be captured with a different exposure setting. For example, each different image may be taken with a different f/stop value, shutter speed, iso setting, and the like.

In one embodiment, the method 700 may also detect different facial regions in the image of the user before the image is transmitted. For example, a D-lib operation may be applied to the image to detect the desired facial regions, as described above.

In one embodiment, the method 700 may also receive contextual input about a skin condition associated with one or more of the plurality of different facial regions. For example, the user may provide notes, questions or skin conditions associated with a particular facial region that can be taken into consideration during the analysis of the image. Alternatively, the image can be analyzed to respond to a particular question that was received in the contextual input.

At block 708, the method 700 transmits the image to a facial skin analysis server for analyzing one or more parameters of the facial skin of the user. For example, the image can be converted from the RGB space to a spectral representation. The image can then be analyzed to obtain independent components such as a melanin component and a hemoglobin component. The independent components may be used to generate graphical chromophore maps.

The graphical chromophore maps may be used to analyze skin textures. The skin textures may identify variations in the skin such as pores, moles, acne, and the like.

In one embodiment, the image may be analyzed to detect wrinkles. The operations that can be applied to detect the wrinkles are described in detail above.

Based on the one or more parameters that are analyzed, the facial skin analysis server may generate an interactive image and generate metadata associated with the interactive image. In one embodiment, the metadata may include information associated with each facial region. For example, the metadata may include response or additional comments to the contextual input that was received for a particular facial region, as described above.

At block 710, the method 700 receives an interactive image of the face of the user that includes metadata associated with the one or more parameters of the facial skin that were analyzed by the facial skin analysis server. The interactive image may be received from the facial skin analysis server via a wired or wireless connection.

At block 712, the method 700 displays the interactive image of the face of the user. For example, a mobile endpoint device of the user may format the interactive image for proper display and display the interactive image to the user. The interactive image may include a plurality of different selectable facial regions that provide a more detailed visualization of the selected facial region as well as associated parameters.

At block 714, the method 700 receives a selection of a facial region of the interactive image.

At block 716, the method 700 generates a detailed visualization of the facial region that is selected. In one embodiment, the detailed visualization of the facial region may be a magnification of the selected facial region. For example, the facial region may be blown up or enlarged over the interactive image via a separate window. For example, the detailed visualization may be "popped out" of the interactive image.

In one embodiment, the detailed visualization of the facial region that is selected may include changing the facial region that is selected from a black and white image to a color image. For example, the entire interactive image may be in black and white. However, when a facial region is selected, the facial region that is selected may be converted into color to show details such as wrinkles, pores, and the like.

The detailed visualization may also display one or more parameters from the metadata that is associated with the facial region that is selected. For example, the metadata may include responses to the contextual input. In another example, the metadata may include values for parameters such as melanin content or hemoglobin content based on the chromophore separation that is performed by the facial skin analysis server.

At block 718, the method 700 determines if additional facial regions are selected. For example, the customer may continue to interact with the interactive image. For example, the customer may continue to view detailed visualizations of other facial regions of the interactive image. If the answer to block 718 is yes, the method 700 may return to block 714 and the method 700 may repeat blocks 714-718.

However, if the answer to block 718 is no, the method 700 may proceed to block 720. At block 720, the method 700 ends.

It should be noted that although not explicitly specified, one or more steps, functions, or operations of the method 700 described above may include a storing, displaying and/or outputting step as required for a particular application. In other words, any data, records, fields, and/or intermediate results discussed in the methods can be stored, displayed, and/or outputted to another device as required for a particular application. Furthermore, steps, functions, or operations in FIG. 7 that recite a determining operation, or involve a decision, do not necessarily require that both branches of the determining operation be practiced. In other words, one of the branches of the determining operation can be deemed as an optional step.

FIG. 8 depicts a high-level block diagram of a computer that can be transformed into a machine that is dedicated to perform the functions described herein. As a result, the embodiments of the present disclosure improve the operation and functioning of the computer (e.g., the mobile endpoint device 108) to improve methods for generating an interactive image of facial skin of a user that is displayed via a mobile endpoint device of the user, as disclosed herein.

As depicted in FIG. 8, the computer 800 comprises one or more hardware processor elements 802 (e.g., a central processing unit (CPU), a microprocessor, or a multi-core processor), a memory 804, e.g., random access memory (RAM) and/or read only memory (ROM), a module 805 for generating an interactive image of facial skin of a user that is displayed via a mobile endpoint device of the user, and various input/output devices 806 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computer may employ a plurality of processor elements. Furthermore, although only one computer is shown in the figure, if the method(s) as discussed above is implemented in a distributed or parallel manner for a particular illustrative example, i.e., the steps of the above method(s) or the entire method(s) are implemented across multiple or parallel computers, then the computer of this figure is intended to represent each of those multiple computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computer or any other hardware equivalents, e.g., computer readable instructions pertaining to the method(s) discussed above can be used to configure a hardware processor to perform the steps, functions and/or operations of the above disclosed methods. In one embodiment, instructions and data for the present module or process 805 for generating an interactive image of facial skin of a user that is displayed via a mobile endpoint device of the user (e.g., a software program comprising computer-executable instructions) can be loaded into memory 804 and executed by hardware processor element 802 to implement the steps, functions or operations as discussed above in connection with the exemplary method 700. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 805 for generating an interactive image of facial skin of a user that is displayed via a mobile endpoint device of the user (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for generating an interactive image of facial skin of a user that is displayed via a mobile endpoint device of the user, comprising:
    displaying, by a processor, a guide to position a face of the user;
    capturing, by the processor, an image of the face of the user, wherein the guide is changed from an outline of a face of a generic model to an outline that corresponds to a shape of the face of the user based on the image of the face of the user that is captured for subsequent images that are captured of the face of the user;
    transmitting, by the processor, the image to a facial skin analysis server for analyzing one or more parameters of the facial skin of the user, wherein the one or more parameters of the facial skin of the user comprises one or more graphical chromophore maps and a texture based upon a chromophore separation performed on the image of the face of the user;
    receiving, by the processor, the interactive image of the face of the user that includes metadata associated with the one or more parameters of the facial skin that were analyzed by the facial skin analysis server; and
    displaying, by the processor, the interactive image of the face of the user.

2. The method of claim 1, wherein the capturing comprises capturing a plurality of different images of the face of the user, wherein each one of the plurality of different images is captured at a different exposure setting.

3. The method of claim 1, further comprising:
    detecting, by the processor, a plurality of different facial regions in the image of the face of the user before the transmitting.

4. The method of claim 3, further comprising:
    receiving, by the processor, a contextual input about a skin condition associated with one or more of the plurality of different facial regions.

5. The method of claim 4, wherein the metadata includes a response to the contextual input for the one or more of the plurality of different facial regions.

6. The method of claim 1, wherein the one or more parameters of the facial skin of the user comprise wrinkles that are identified from the image of the face of the user.

7. The method of claim 1, wherein the one or more parameters of the facial skin of the user comprise pores that are identified from the image of the face of the user.

8. The method of claim 1, wherein the interactive image provides selectable facial regions of the face for a detailed visualization of a facial region that is selected.

9. The method of claim 8, wherein the detailed visualization comprises magnifying the facial region that is selected.

10. The method of claim 8, wherein the detailed visualization comprises changing the facial region that is selected from a black and white image to a color image.

11. The method of claim 8, wherein the detailed visualization of the facial region that is selected comprises displaying the one or more parameters from the metadata that are associated with facial region that is selected.

12. A non-transitory computer-readable medium storing a plurality of instructions, which when executed by a processor, cause the processor to perform operations for generating an interactive image of facial skin of a user that is displayed via a mobile endpoint device of the user, the operations comprising:
displaying a guide to position a face of the user;
capturing an image of the face of the user;
transmitting the image to a facial skin analysis server for analyzing one or more parameters of the facial skin of the user, wherein the one or more parameters of the facial skin of the user comprises one or more graphical chromophore maps and a texture based upon a chromophore separation performed on the image of the face of the user;
receiving the interactive image of the face of the user that includes metadata associated with the one or more parameters of the facial skin that were analyzed by the facial skin analysis server;
displaying the interactive image of the face of the user;
changing the guide from an outline of a face of a generic model to an outline that corresponds to a shape of the face of the user based on the image of the face of the user that was captured; and
displaying the guide that is changed with the outline that corresponds to the shape of the face of the user to capture subsequent images of the face of the user.

13. The non-transitory computer-readable medium of claim 12, further comprising:
detecting a plurality of different facial regions in the image of the face of the user before the transmitting.

14. The non-transitory computer-readable medium of claim 13, further comprising:
receiving a contextual input about a skin condition associated with one or more of the plurality of different facial regions.

15. The non-transitory computer-readable medium of claim 14, wherein the metadata includes a response to the contextual input for the one or more of the plurality of different facial regions.

16. The non-transitory computer-readable medium of claim 12, wherein the interactive image provides selectable facial regions of the face for a detailed visualization of a facial region that is selected.

17. The non-transitory computer-readable medium of claim 16, wherein the detailed visualization of the facial region that is selected comprises displaying the one or more parameters from the metadata that are associated with facial region that is selected.

18. A method for generating an interactive image of facial skin of a user that is displayed via a mobile endpoint device of the user, the method comprising:
displaying, by a processor, an outline over an image capture preview to position a face of the user, wherein the outline has a shape that is similar to the face of the user based off a previously captured image of the face of the user;
capturing, by the processor, an image of the face of the user;
identifying, by the processor, a plurality of facial regions of the face of the user in the image;
transmitting, by the processor, the image and the plurality of facial regions of the face of the user that is identified to a facial skin analysis server for analyzing one or more parameters of the facial skin of each one of the plurality of facial regions of the user, wherein the one or more parameters of the facial skin of the user comprises one or more graphical chromophore maps and a texture based upon a chromophore separation performed on the image of the face of the user;
receiving, by the processor, the interactive image of the face of the user that includes metadata associated with each one of the plurality of facial regions of the user, wherein the metadata comprises the one or more parameters of the facial skin that were analyzed by the facial skin analysis server for a respective facial region of the plurality of facial regions;
displaying, by the processor, the interactive image of the face of the user;
receiving, by the processor, a selection of a facial region of the plurality of facial regions on the interactive image of the face; and
generating, by the processor, a detailed visualization of the facial region that is selected that includes the one or more parameters of the facial skin associated with the facial region that is selected from the metadata.

\* \* \* \* \*